United States Patent [19]
Hopkins, Jr. et al.

[11] 4,109,276
[45] Aug. 22, 1978

[54] MEMORY READ/WRITE ORGANIZATION FOR A TELEVISION SIGNAL PROCESSOR

[75] Inventors: Robert Sherman Hopkins, Jr., Marlton; Arthur James Banks, Cherry Hill; Robert Adams Dischert, Burlington, all of N.J.

[73] Assignee: RCA Corporation, New York, N.Y.

[21] Appl. No.: 755,949

[22] Filed: Dec. 30, 1976

[30] Foreign Application Priority Data

Mar. 19, 1976 [GB] United Kingdom ............... 11113/76

[51] Int. Cl.² .......................... H04N 5/78; H04N 9/46
[52] U.S. Cl. ........................................... 358/4; 358/19
[58] Field of Search ...................... 358/4, 8, 22, 17, 19, 358/149; 360/10, 11, 32, 33, 35, 36, 38

[56] References Cited
U.S. PATENT DOCUMENTS 3,564,123  2/1971  Pezirtoglov ............................ 360/10
3,890,638  6/1975  Bargen ................................... 358/8

OTHER PUBLICATIONS

Stratton, "Reviewing Slow-Motion Disc Principles", Broadcast Engineering, Feb. 1969, pp. 14–18.

Primary Examiner—John C. Martin
Attorney, Agent, or Firm—Eugene M. Whitacre; Paul J. Rasmussen; Mason DeCamillis

[57] ABSTRACT

In a television signal synchronizer having a coherent memory, it is necessary to modify the writing of data into memory or the reading of data out of memory in order to provide field conversion. In the described apparatus, the reading out of data is always done according to a non-variant sequence determined by the local (studio) reference timing signals. In a first embodiment the read address generator signals are modified so as to read out the stored video signal in accordance with the non-variant write in sequence. In a second embodiment the write address generator signals are modified so as to position the incoming video signal into memory so that it is located in the proper memory position for the non-variant read out sequence.

3 Claims, 21 Drawing Figures

MEMORY READ/WRITE ORGANIZATION FOR A TELEVISION SIGNAL PROCESSOR

BACKGROUND OF THE INVENTION

This invention relates to television synchronization apparatus and especially to apparatus for providing field conversions during the synchronizing of television signals from two or more non-synchronous sources of video information.

In modern television programming, it is generally necessary to integrate a mix of external and studio video sources smoothly into live programs. An example of such a requirement is the increasing use of Electronic Journalism (EJ) facilities for on-the-spot news broadcasts. The wide diversification of such program sources has emphasized the need for synchronizing systems to incorporate non-synchronous video signals originating outside the local studio. Integrating a non-synchronous source into an existing program presents a serious production problem, since it is necessary to gen-lock studio sync to the outside signal or to use additional sync generators for the proper timing reference. Gen-locking to the external non-synchronous source is particularly troublesome in that only one source at a time may be utilized and that source tends to disrupt the internal studio sync timing. The use of multiple sync generators is expensive and creates further operational difficulties in maintaining gen-lock between the multiple generators. Similar problems are encountered in network cable and satellite transmission systems even though expensive rubidium standards are used because changes in the electrical path length causes the color phase of the video signal to drift, even though the horizontal signal timing component may be relatively stable.

A video synchronizer may be advantageously used to overcome the problems of incorporating non-synchronous program sources into a local studio broadcast where the conventional gen-locking methods described above do not provide a satisfactory solution. A video synchronizer is primarily a digital device, which accepts a non-synchronous video signal input from any external source, converts the signal from analog to digital format; stores the digitized signal in a memory; converts the digital signal back to analog form and processes the reconverted signal through a signal processing amplifier wherein sync, blanking and color burst signals are added to the output video signal. The digitized video information stored in memory is read out of the memory at a rate which is synchronous with the local studio sync generator timing. Since the reconstituted video signal is now completely synchronous with the local studio reference, it may be used directly for mixing, special effects, etc., similar to the manner in which a live camera, a video tape machine or other studio source is used.

However, in a synchronizer that does not individually store each of the four unique color fields of the NTSC system, provisions must be made for converting the video of each of these four unique fields into some other fields because of the unknown and random timing relationship between the non-synchronous input and the known timing of the house reference. For example, in a synchronizer which employs only one field of storage, it must be possible to modify any of the four input fields to be used as any of the four output fields. In a frame synchronizer, it must be possible to modify either of the two input odd fields or even fields to be used as any of the two output odd fields or even fields, respectively.

SUMMARY OF THE INVENTION

A television signal synchronizer apparatus is providing for making field conversions between an input video signal and an output video signal, the input and output video signals being non-synchronous.

The apparatus comprises input and output video processing means adapted to be coupled to memory storage means.

A source of independent reference signals having a non-variant field sequence.

Memory control means including memory input means for writing the input video signal into the memory storage means and memory output means for reading the output video signal out of the memory storage means.

Means for developing field identification signals from one of the input video signal or the independent reference signal.

Means for developing a source of field conversion signals from the field identification signals and the non-variant field sequence signal.

Delay means coupled to the memory input and the memory output means responsive to the source of field conversion signals and the field identification signals for modifying the writing and reading of data in and out of the memory storage means so as to provide field conversions consistent with the non-variant field readout sequence.

DESCRIPTION OF THE INVENTION

Figure 1:
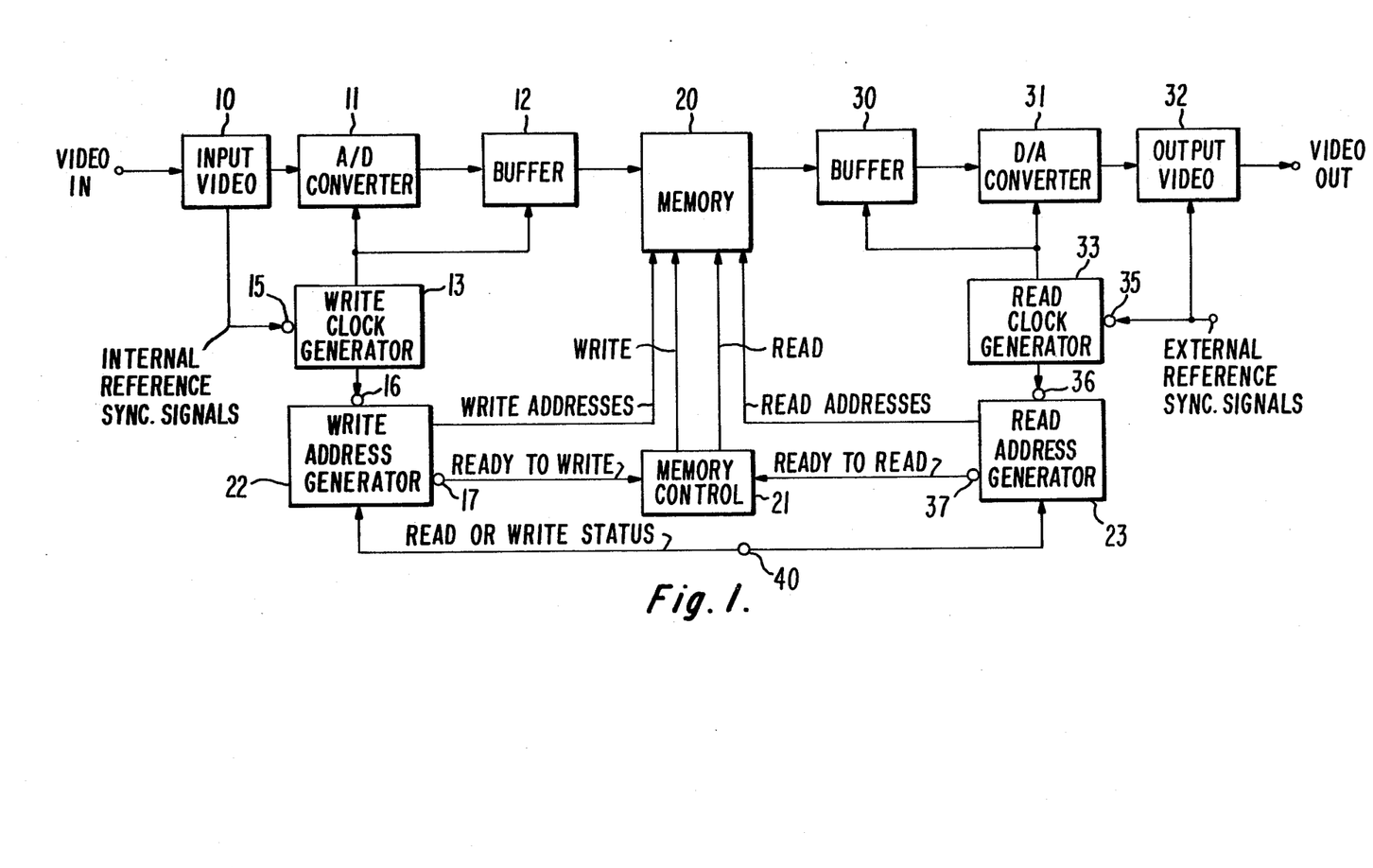
FIG. 1 is a block diagram of a television signal synchronizer embodying the present invention.

In FIG. 1, a signal (Video In) from a nonsynchronous source, such as an Electronic Journalism (EJ) camera, is coupled to an input terminal of an input video processor 10 in which the incoming video signal synchronizing components and burst timing information are separated from the active picture information. The separated timing information is coupled to a write clock generator 13 which develops timing information in the form of 14.3MHz pulses (four times the NTSC subcarrier frequency of 3.58MHz), synchronous with the incoming signal timing information, for enabling an analog-to-digital (A/D) converter 11, buffer 12 and write address generator 22. The active picture information portion of the incoming video signal is bandwidth limited to 5.5 Megahertz in the input video processor 10 and coupled from the output terminal of video processor 10 to the input terminal of A/D converter 11, of known form, where the signal is converted (sampled at a 14.3 Megahertz word rate) into digital form consisting of 8 bit parallel code words.

Figure 2:
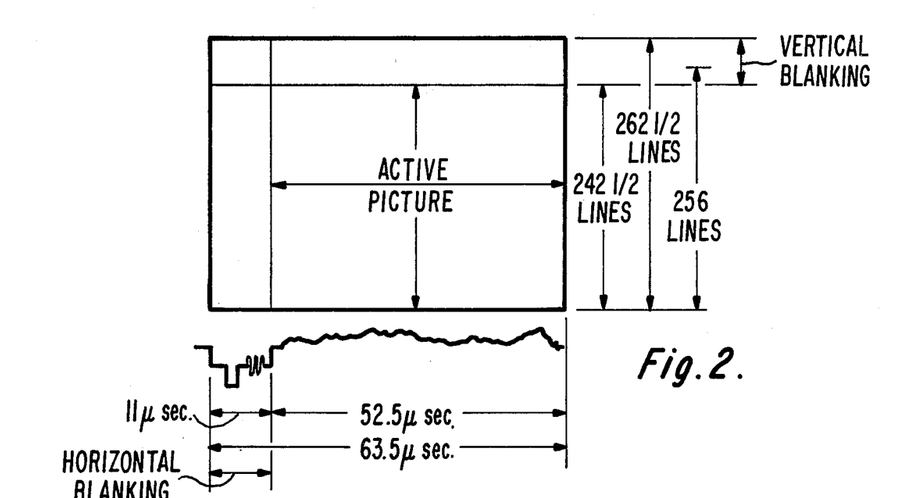
FIG. 2 illustrates in graphical form typical television line and field standards useful in understanding the invention.

The signal output of A/D converter 11, in the form of a digitally sampled input video signal, is coupled to a buffer 12 and, in turn, to picture memory 20 for storage. The digital picture information signal is stored at discrete locations in the memory in accordance with specific address codes referenced to burst, vertical and horizontal sync signals generated by the write address generator 22 in response to the related incoming signal timing information generated in the write address clock. Memory 20 is constructed, for example, with memory integrated circuits, such as the Fairchild 40965DC RAM. A typical integrated circuit RAM of the type described has a storage capacity of 4096 bits of information, the total capacity of the memory 20 is determined by the number of bits of information desired to be stored. In a typical synchronizer of the type illustrated in FIG. 1, constructed in accordance with known techniques and utilizing a clock rate of 14.3 Megahertz, a field memory store would require 7280 bits of memory (910 samples times 8 bits per sample) for each horizontal line period of 63.5 Microseconds, which yields a total of 1,863,680 bits of memory for storing the 256 lines of information corresponding to the 262 ½ vertical lines in a full field, as illustrated in FIG. 2. The indicated reduction of vertical line storage from 262 ½ to 256 is a practical solution to reducing the expensive memory cast consistent with economical memory logic structure. As illustrated in FIG. 2, the active picture area actually comprises 242 ½ lines with the other 20 lines being utilized for the vertical blanking interval. The vertical blanking interval also contains other signal processing information, such as the Vertical Interval Test Signal (VITS) on lines 17 and 18; Vertical Interval Reference Signal (VIRS) on line 19; and the Field Source Identification Signal on line 20 - therefore, it is possible to completely store the 242 ½ active vertical picture information lines per field as well as the vertical interval signal processing information within the 256 lines of memory by beginning the vertical line information storage at line 15.

If the synchronizer is to be of the full frame variety, which requires the storage of two complete fields, the memory store would require 910 samples per line times 8 bits per sample times 256 lines per field times 2 fields or 3,727,360 bits of memory.

As previously described, the digital picture information is coupled from input video processor 10 to the memory store by means of a buffer 12. Buffer 12 provides a convenient means to overcome a limitation on the data read-in rate of the typical integrated circuit RAM's currently available. The 14.3 MHz clock rate at four times subcarrier was selected to provide sufficient resolution of the picture information being digitized in the A/D converter; however, the typical RAM data read-in rate is generally limited to a 2MHz rate. Buffer 12, which is in the form of an 8 word-serial-in/parallel-out (SIPO) configuration provides a convenient means for accommodating this difference in data rates. Data is serially read into buffer 12 at the 14.3 MHz rate and may be read-out in parallel form at no more than one-eighth of the read-in rate, thus readily adjusting the incoming signal to the data into memory information rate of 2MHz.

In order to recover the picture information stored in the memory 20, the signal conversion process is reversed as follows: the data stored in memory 20 is read-out of memory 20 into a parallel-in/serial-out (PISO) buffer, which is, in turn, coupled to a digital-to-analog (D/A) converter 31, which converts the 8 bit code word back to a conventional analog picture by timing information and read address generated by read clock generator 33 and read address generator 23, which are synchronized to the local studio reference. The output of D/A converter 31 is coupled to an output video processor 32 in which the blanking interval, sync and burst corresponding to local studio reference are added to the recovered picture information to restore the output video signal to a complete composite video signal, as illustrated in FIG. 2. Thus, the picture information, which was stored in memory 20 from a non-synchronous source is read-out of the memory synchronous with the local studio reference, which makes the signal suitable for programming production requirements of mixing, special effects and switching similar to the manner in which a live camera, VTR tape or other source is used.

Memory control 21 completes the synchronizer of FIG. 1 and includes logic circuitry which responds to status signals from the write and read address generators identified in FIG. 1 as ready-to-write and ready-to-read, respectively, so as to provide write and read signals to memory 20 to insure that reading and writing into the same address location does not occur simultaneously as would be the case where non-synchronous video sources may drift ahead and behind the fixed local studio reference.

As previously described, one of the features of a television synchronizer is the ability to provide a video output signal synchronized to a local (studio) reference from one or more non-synchronous video sources. In the event a synchronizer which has only one or two fields of storage is being utilized for this function, because of the random timing relationship between non-synchronous input and the local or studio reference, the proper field for the succeeding field read out may not be available from the memory storage. Under these conditions, it is necessary to provide a means for field conversions if the output video signal from the synchronizer is to be continuous and in synchronism with the local reference. In the NTSC color system, there are four distinct fields in a complete color signal with the burst phasing of each odd field being precisely 180° from the succeeding odd field; thus if field 1 is designated as having an initial burst phasing of 0°, field 3 will have a burst phasing of 180°, and therefore, the even fields 2 and 4 are 180° and 0° respectively. Since it is desired that the video output signal from the synchronizer be synchronous with the local (studio) reference and that the system standards (NTSC) be maintained, the read-out of memory sequence is made non-variant as field 1, field 2, field 3, field 4, which has a designated burst sequence of 0°, 180°, 180°, 0°, respectively. Having established the read-out of memory as a non-variant sequence, it is necessary to evaluate the fields stored in the memory in order to determine if the available fields have the correct burst phasing. A particularly advantageous memory storage construction useful in a television signal synchronizer of the form illustrated in FIG. 1 is known as a coherent memory and is described in detail in the copending application of R. A. Dischert et al., assigned to the same assignee and filed concurrently herewith entitled, "Television Synchronizing Apparatus". A coherent memory, as described in the co-pending application, Ser. No. 755,944, by R. A. Dischert et al., has a pre-assigned fixed burst phasing of 0° or 180° for each line store of color video image information. In writing data into a coherent memory, it is readily recognized that in a television signal synchronizer, the horizontal sync timing and burst phasing information contained in the horizontal blanking interval of the incoming video signal is utilized only for the purposes of identification for proper writing-into-memory of the image portion of the video signal; and that new horizontal sync and burst timing components synchronous with the local (studio) reference are established during the readout of the memory store 20. Since these incoming synchronizing components are discarded during readout, it is similarly possible to discard the incoming synchronizing components including the burst phasing information on the premise that they are well-known repetitive functions; therefore, the incoming color video information is read into memory 20 coherent with the preassigned burst phasing. Discarding, i.e., not storing, the horizontal blanking interval information during each horizontal line, reduces the time period of each line during which information is to be stored to 52.5μsec corresponding to the actual video image portion of the line, as illustrated in FIG. 2. Utilizing the same clock rate of 14.3 MHz, as previously described, the number of samples per line to be stored is reduced from 910 to 768, thereby significantly reducing the overall capacity and cost of memory 20 by approximately 16%. However, discarding of the incoming burst signal component, which represents the color phasing of the video information, presents a further problem which must be resolved if the advantages of a coherent memory having a preassigned burst phasing are to be realized. As previously described in the NTSC color system, there are four distinct fields in a color signal with the burst phasing of each odd field being precisely 180° from the succeeding odd field; thus, if field 1 is designated as having an initial burst phasing of 0°, field 3 will have a burst phasing of 180°, and, therefore, the even fields 2 and 4 are 180° and 0°, respectively. Therefore, in a coherent memory having a preassigned fixed burst phasing, for example, fields 1 and 4 at 0° and fields 3 and 2 at 180°, it is necessary to modify the reading into memory of fields 3 and 2 so that these fields are stored with identical burst phasing to fields 1 and 4. FIGS. 3a and 4a–4f illustrate how write clock generator 13 and write address generator 22 of the apparatus of FIG. 1 may be constructed to provide coherence of the image information being written into a coherent memory store.

The incoming horizontal sync timing and burst information from input video processor 10 appearing at terminal 15 of FIG. 1 is coupled to a subcarrier crossover detector in the write clock generator 13 of FIG. 1 illustrated in FIG. 3a as follows. The horizontal sync of approximately 5μsec duration (waveform 4a) is coupled to the input terminal of a voltage controlled one-shot multivibrator 100 which produces a pulse of approximately 2.3μsec duration (waveform 4b) timed from the leading edge of the horizontal sync pulse. The output signal of multivibrator 100 is coupled to a one-shot multivibrator 110 which produces a pulse of a duration greater than 140 nanoseconds timed from the trailing edge of waveform 4b and to the reset terminal R of a D flip-flop 130. The output signal from multivibrator 110 and the $\overline{Q}$ output signal from D flip-flop 130 are coupled to the input terminals of an AND gate 150. The burst subcarrier is coupled to a multiplier 140 where its frequency is doubled and, in turn, to terminal T of the D flip-flop where it serves as a trigger or clock signal for "D" type flip-flop 130. A biasing voltage +V is coupled to the enabling input terminal of flip-flop 130 to condition the $\overline{Q}$ output of flip-flop 130 for a LOW level.

Insofar as described, the operation of the subcarrier crossover detector of FIG. 3a operates in the following manner. The incoming horizontal sync (waveform 4a) enables multivibrator 100 (waveform 4b), which, in turn, enables multivibrator 110 (waveform 4c) providing one input to AND gate 150 and resets D flip-flop 130 (waveform 4d), which provides the other input to AND gate 150. The subcarrier output of multiplier 140 (waveform 4e) then triggers D flip-flop 130 on the very next edge of subcarrier corresponding to a positive edge of two times subcarrier, which causes the $\overline{Q}$ output of the D flip-flop to go low and disable AND gate 150. The trailing edge of the output pulse of AND gate 150 (waveform 4f) represents a precise location for this modified sync signal with respect to burst, which is necessary when burst and sync are not stored. Since the subcarrier burst signal is not defined in the television standards with respect to the leading edge of sync, it is possible for the output of AND gate 150 to vary in width from approximately 0 to 140 nanoseconds in time with 0 time representing a coincidence between subcarrier and the leading edge of sync so as to prevent the subcarrier crossover detector of FIG. 3 from reliably indicating the burst phasing at the output of AND gate 150. To avoid this problem, a hysteresis feedback loop is incorporated in the circuit of FIG. 3a by coupling the output of AND gate 150 to a lowpass filter 120, which develops a voltage at its output representing the average width of the output pulse of AND gate 150. The output signal of low-pass filter 120 is coupled to voltage controlled multivibrator 100 where it is utilized as a control voltage to modify the duration of the output signal of multivibrator 100 to insure an adequate time difference for the generation of the output pulse from AND gate 150.

Figure 6A:
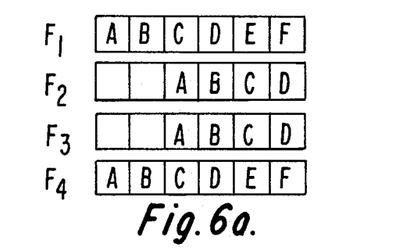
FIG. 6a–c illustrate memory storage locations useful in understanding a first embodiment of the invention.
Figure 6B:
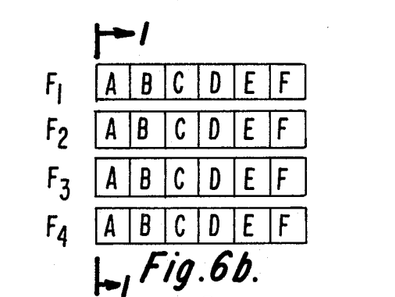
Figure 6C:
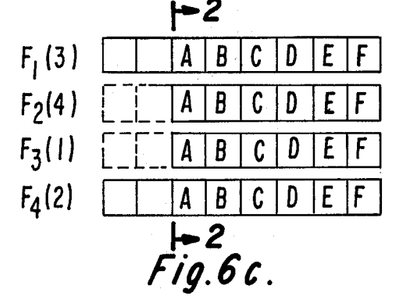
Figure 7A:
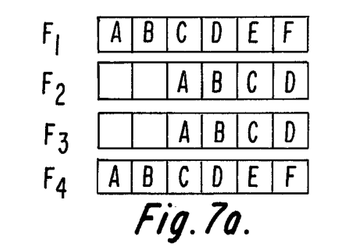
FIGS. 7a–d illustrate memory storage locations useful in understanding a second embodiment of the invention.

The output signal from AND gate 150, which represents a composite of the horizontal sync and burst timing of the incoming color video information, is coupled to terminal 16 of write address generator 22 of FIG. 1 and, in turn, to a switch $S_1$, shown diagrammatically, which couples in a first position the composite horizontal sync and burst timing signal directly to the ready-to-write pulse generator in write address generator 22 in which the ready-to-write-into memory signal appearing at terminal 17 of FIG. 1 is developed. In the other position of switch $S_1$, the output signal of AND gate 150 is delayed in delay circuit 170 a fixed amount, 140 nanoseconds in the NTSC system, so as to delay the development of the ready-to-write-into memory signal, which effectively shifts the color image information by 180° to coincide with the preassigned burst phasing of coherent memory 20. A field identification switch 190 enabled by the field identification signal of the incoming video signal is utilized to determine if the writing-into-memory is to be delayed in the following manner. Field 1 - no delay, field 3 - delay, field 2 - delay and field 4 - no delay. Thus, the color video information is stored coherently in accordance with the preassigned burst phasing in a memory of significantly reduced capacity, as illustrated in FIGS. 6a and 7a, wherein the first six bits of memory for each of fields 1, 2, 3, 4 (beginning at line 10 of each field in the NTSC system) are shown as blocks A, B, C, D, E & F. Since the burst phasing information is now incorporated in the coherent memory, it is possible to adjust the reading of data out of the memory so that the burst phasing of the color video image information out of memory coincides with the non-variant field sequence of the local reference. This may be accomplished by modifying the readout of the stored data only on read-out from memory in a first operational sequence, as illustrated in Table A and FIGS. 6a, 6b and 6c or alternatively by modifying the writing-into-memory of data in an alternative operational sequence, as illustrated in Table B and FIGS. 7a, 7b, 7c and 7d.

Table A

|  | Column 1 | Column 2 | Column 3 |
|---|---|---|---|
| field 1 | 0 | 0 | 0 |
| field 2 | 140 nsec. | 140 nsec. | −140 nsec. |
| field 3 | 140 nsec. | 140 nsec | −140 nsec. |
| field 4 | 0 | 0 | 0 |

FIG. 6a and Column 1 of Table A illustrates the burst phasing of the color image information in terms of storage delay for each field as stored in a coherent memory. (140 nanoseconds being equal to a phase reversal of 180° at 3.58 MHz in the NTSC system). Column 2 illustrates the non-variant field read-out delay to achieve the required NTSC field burst sequence, while Column 3 illustrates the read-out modification for making field conversions. From Table A, Columns 1 and 2, it can be seen that the read-out delay corresponds to the delay of the image signal stored in the memory, and a direct read-out of the memory information is possible with the first active bit of each field in line vertically as is required and illustrated by FIG. 6b. However, when field conversion must be made utilizing a frame synchronizer, a field 1 must be made (converted) from a field 3 [$F_1$ (3)] a field 2 from a field 4 [$F_2$ (4)], a field 3 from a field 1 [$F_3$ (1)] and a field 4 from a field 2 [$F_4$ (2)]. It is necessary, therefore, in view of the non-variant read-out sequence to further modify the readout of data, as illustrated in Column 3, if a correctly re-assembled picture is to be achieved. In the case of a conversion of a field 3 to a field 1, it is noted that field 3 was stored in memory with a 140 nanosecond delay (Column 1) and normally read out with a 140 nanosecond delay (Column 2). When field 3 is read out to produce field one, the leading edge of the picture information is displaced 2 bits or 140 nanoseconds to the right ($F_1$ (3) of FIG. 6c) because the non-variant readout sequence for a field 1 begins at 0° phase (no delay). Similarly, when a field 4 is converted to a field 2, the leading edge of the picture information is also displaced 140 nanoseconds to the right ($F_4$ (2) of FIG. 6c). However, when a field 2 is constructed by conversion of a field 4 or a field 3 from a field 1, it is necessary to further modify the readout from memory. The initial image information from fields 2 and 3 was stored in memory delayed by 140 nanoseconds (Column 1) and would normally be read out by the non-variant sequence with a delay of 140 nanoseconds (Column 2) so as to align the initial image information bits. If no provision to modify the readout is made, the initial image information conversion of fields 2 and 3 will differ by 280 nanoseconds from the initial image information of conversion fields 1 and 4, which will produce an unacceptable picture. Therefore, as illustrated in Column 3 and $F_2$ (4), $F_3$ (1) of FIG. 6c, a negative delay or advance of 140 nanoseconds in reading out of memory is provided when converting fields 2 and 3 so that the initial image information appears at the output of the memory storage coincident with the initial image information of fields 1 and 4. Since the entire series of conversion fields now appears 140 nanoseconds to the right, as shown in FIG. 6c, the final reconstructed picture will shift 140 nanoseconds to the right (datum line 2-2 of FIG. 6c as compared to datum line 1-1 of FIG. 6b) with respect to the local studio horizontal sync; however, the color will be correct and the slight horizontal shift of the picture is relatively unnoticed by the viewer.

Table B

|  | Column 1 | Column 2 | Column 3 |
|---|---|---|---|
| field 1 | 0 | 0 | 0 |
| field 2 | 140 nsec. | 140 nsec. | −140 nsec. |
| field 3 | 140 nsec. | 140 nsec. | −140 nsec. |
| field 4 | 0 | 0 | 0 |

Figure 7B:
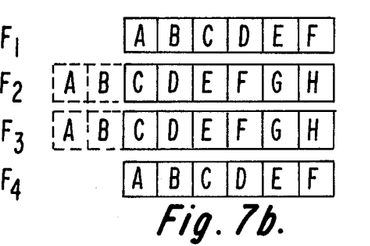
Figure 7C:
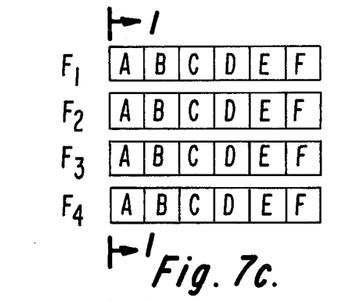
Figure 7D:
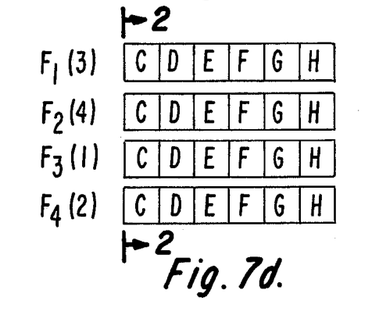

FIG. 7a and Column 1 of Table B illustrates the burst phasing of the color image information in terms of storage delay for each field as stored in a coherent memory for the alternative of modifying the writing-into-memory. Column 2 of Table B illustrates the non-variant field readout delay to achieve the required NTSC field burst sequence, while Column 3 illustrates the writing-into-memory modifications for making field conversions in the alternative to that shown in Table A. The reading into and out of memory operational sequence in the alternative embodiment is identical to that described in conjunction with Table A when no conversions are being made and is illustrated by observation that Columns 1 and 2 of Tables A and B correspond as does FIGS. 6a, 6b and FIGS. 7a and 7c. However, when making field conversions, a field 1 must be made (converted) from a field 3 [$F_1$ (3)], a field 2 from a field 4 [$F_2$ (4)], a field 3 from a field 1 [$F_3$ (1)] and a field 4 from a field 2 [$F_4$ (2)]. It is necessary, therefore, in view of the non-variant readout sequence to effectively modify the writing of the data into the memory, as illustrated in Column 3 of Table B if a correctly reassembled picture is to be achieved. This may be accomplished, as will be described in conjunction with the apparatus of FIGS. 3a, 3b, 5a, 5b by modifying the writing-into-memory, as illustrated in FIG. 7b. In FIG. 7b, phantom bits, shown in dotted form in fields $F_2$ and $F_3$, are created so that the data written into memory in anticipation of field conversions is in the proper field burst sequence for the non-variant readout sequence of Column 2 of Table B. In actual practice, memory spaces do not exist for the phantom bits shown in FIG. 7b and the image information indicated in these blocks is merely discarded; however, the image information is now in memory in a proper sequence so that the non-variant readout sequence produces a reconstructed picture illustrated by $F_1$ (3), $F_2$ (4), $F_3$ (1), $F_4$ (2) of FIG. 7d. In this alternative operational sequence, the datum line for readout indicated as 1-1 in FIG. 7c, and 2-2 in FIG. 7d has not shifted, but the picture content has been shifted two bits or 140 nanoseconds to the left, as shown in FIG. 7c by $F_1$ to $F_4$ beginning at bit A, and FIG. 7d by $F_1$ to $F_4$ beginning at bit C. As stated in conjunction with the description of Table A and FIGS. 6a to 6c, the shift of 140 nanoseconds in picture content is relatively unnoticed by the viewer since the color is correct during the field conversions.

FIGS. 3a, 3b, 4a to 4h and 6a to 6c illustrate how read clock generator 33 and read address generator 23 of the apparatus may be modified in accordance with the principles of the invention to modify the reading-out-of memory during field conversions with a non-variant field write-in sequence. The apparatus of FIG. 3a has previously been described in connection with the reading into a coherent memory of data. FIG. 3b illustrates the further modifications, in the form of a time delay circuit 175, switch S2 and field converting switch circuit 195, to the read clock generator 33 and read address generator 23 of FIG. 1 to provide the effective time delay advance shown for fields 2 and 3 of Table A when making field conversions. In operation, the apparatus of FIG. 3b when not making field conversions is substantially identical to that of FIG. 3a. Field convert switch 195 is not enabled by the read/write status signal of address generator 23; therefore, switch S2 is open which allows delay circuit 175 to delay the output of AND gate 150 140 nanoseconds. Fields 2 and 3 are further delayed; yet another 140 nanoseconds by operation of switch S₁ and delay circuit 170 (waveform 4h). Therefore, fields 1 and 4 have been delayed 140 nanoseconds and fields 2 and 3 280 nanoseconds, and the field image data is read from memory with fields 2 and 3 140 nanoseconds later than fields 1 and 2. The addition of the delay circuit 175 would normally produce color phase errors, but this is easily compensated for by decreasing the pulse of multivibrator 100 by 140 nanoseconds. When a field conversion is to be made, the field convert switch 195 and field identification switch 190 are enabled by the combination of read status signal and field identification on fields 2 and 3 which now closes switch S2 and moves S1 to the no delay position, thereby removing delay circuit 175 and 170 from the ready-to-read signal path on fields 2 and 3, which effectively advances the reading of fields 2 and 3, as shown in waveform 4f. Thus, converted fields 2 and 3 are read out as shown in FIG. 6c by $F_2$ (4) and $F_3$ (1).

FIGS. 5a, 5b, 4a to 4h and 7a to 7d illustrate how write clock generator 13 and write address generator 22 may be modified in accordance with the principles of the invention to modify the writing-into-memory during field conversions with a non-variant field readout sequence.

Figure 3A:
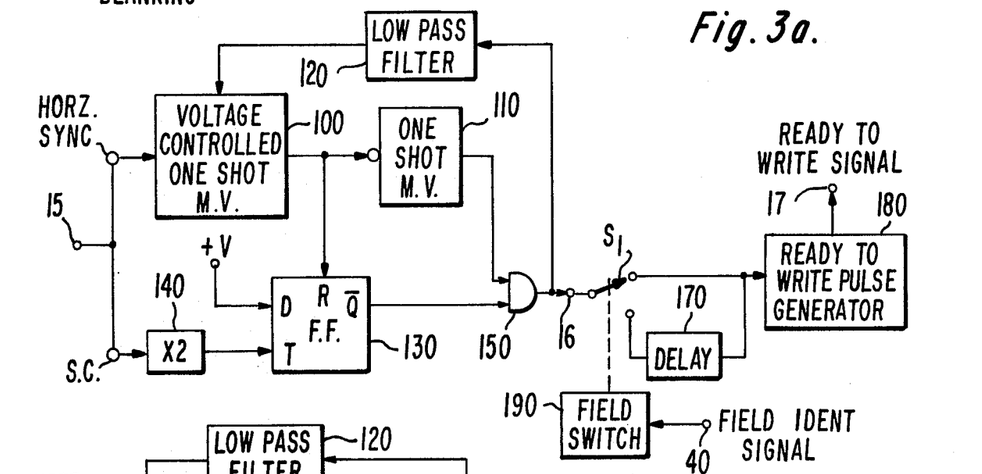
FIG. 3a is a block diagram of the coherent memory write signal logic in a first embodiment of the invention.
Figure 3B:
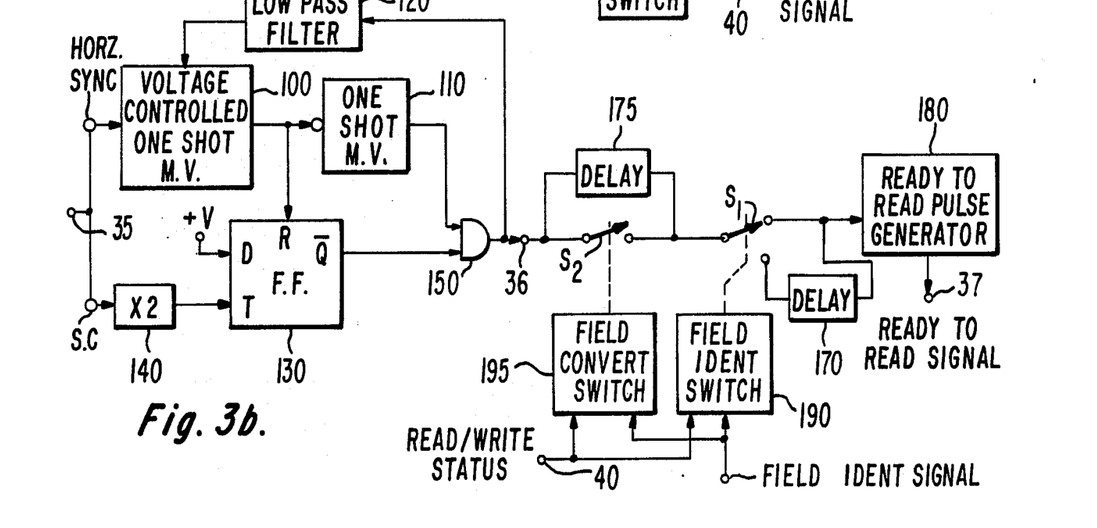
FIG. 3b is a block diagram of the coherent memory read signal logic in a first embodiment of the invention.
Figures 4A, 4B, 4C, 4D, 4E, 4F, 4G, 4H:
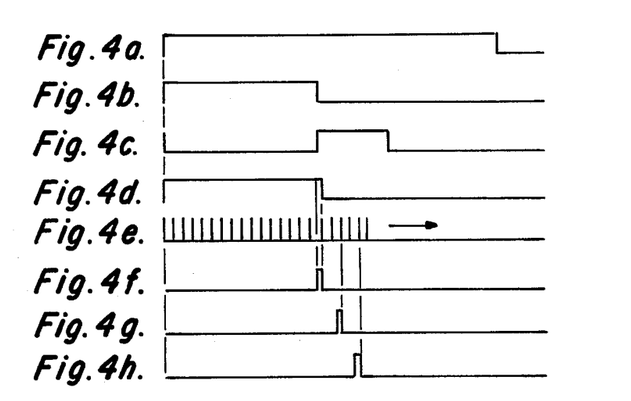
FIG. 4a–h illustrate waveforms depicting the operation of the block diagrams of FIGS. 3a, 3b, 5a, 5b.
Figure 5A:
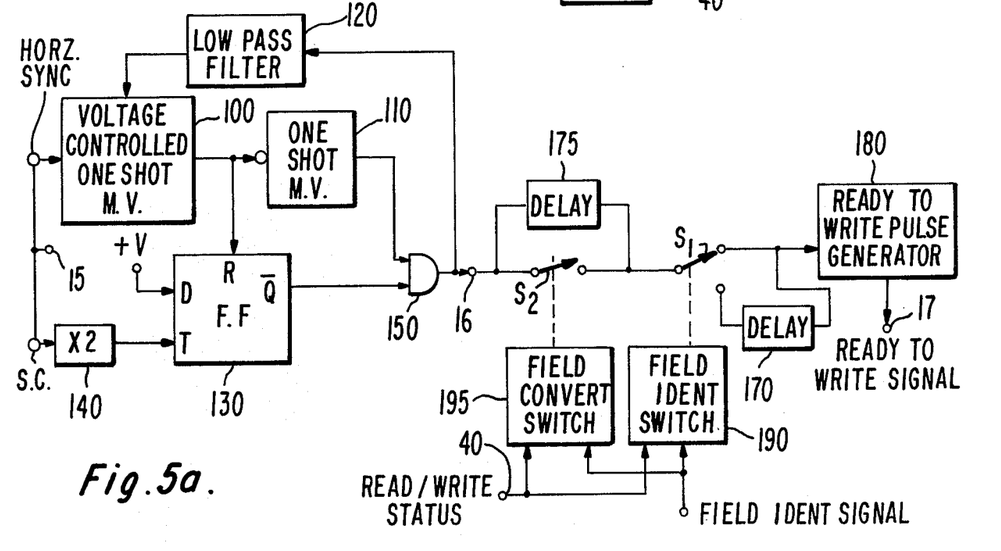
FIG. 5a is a block diagram of the coherent memory read signal logic in a second embodiment of the invention.
Figure 5B:
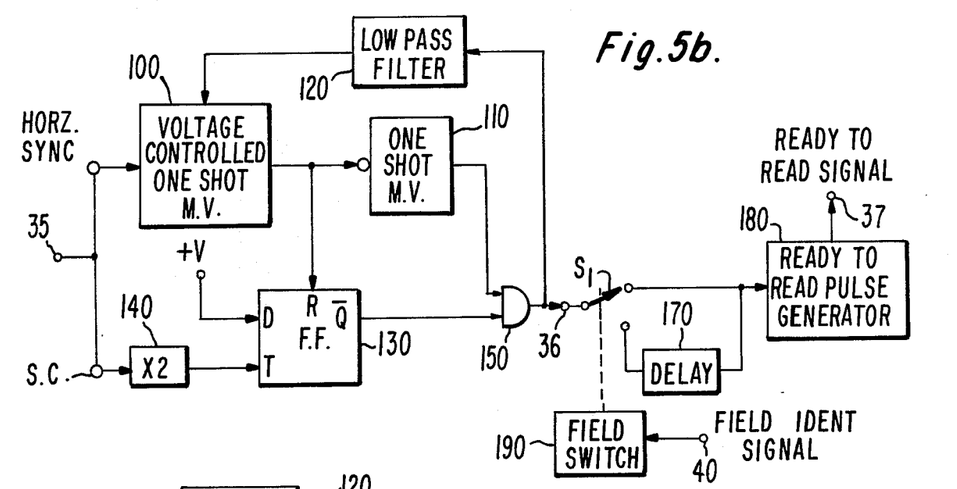
FIG. 5b is a block diagram of the coherent memory write signal logic in a second embodiment of the invention.

The operation of the structure of FIGS. 5a and 5b are identical to FIGS. 3a and 3b with the exception that their function is interchanged, i.e., the structure of FIG. 3a for writing-into-memory is now utilized for as FIG. 5a for reading out of memory, and in a similar fashion the structure of FIG. 3b utilized for modifying the readout from memory is now utilized as FIG. 5b for modifying the writing-into-memory. The interchangeability of the structures of FIGS. 3a to 5a is further indicated by the use of identical terminal designations 15, 16, 17 in FIGS. 3a, 5a and FIG. 1. Similarly, terminals 35, 36, 37 and 40 of FIGS. 3b and 5b correspond to terminals 35, 36, 37 and 40 of FIG. 1. The writing-in and reading-out of memory being as shown in FIGS. 7a–7d.

Although the present invention has been described in terms of a composite video signal according to the NTSC television standards, the principles of the invention are equally applicable to other television standards, such as PAL, PAL-M, and SECAM. These other standards do contain differences from the NTSC system which require modifications to portions of the synchronizer, among these are: the clock frequencies must be adjusted for differences in subcarrier frequency which determines the number of samples per line, i.e., 4.43 MHz in PAL versus 3.58 MHz in NTSC. Similarly, the capacity of the memory in terms of lines stored must be adjusted to accommodate the number of vertical lines in each system, typically 625 in PAL, 525 in PAL-M, and 625 in SECAM. In addition, the memory organization and controlling logic must be adjusted to the individual color signal differences in each system such as the eight unique fields in PAL in terms of burst phase sequence as against only four unique fields in terms of the NTSC burst phase sequence, while in SECAM the burst frequency in the form of an undeviated subcarrier alternates on each line but is of a difference frequency on each line. The horizontal and vertical synchronizing signals of each television system must also be accommodated in generating the write addresses for writing-into-memory and generating the read addresses for reading-out-of-memory.

What is claimed is:

1. Television signal synchronizer apparatus for providing field conversions between an input video signal and an output video signal, said input and output video signals being non-synchronous, comprising:

input and output video processing means adapted to be coupled to memory storage means;

a source of independent reference signals having a non-variant field sequence;

memory control means including memory input means for writing said input video signal into said memory storage means and memory output means for reading said output video signal out of said memory storage means;

means for developing field identification signals from one of said input video signal or said independent reference signal;

means for developing a source of field conversion signals from said field identification signals and said non-variant field sequence signal, and delay means coupled to said memory input and said memory output means responsive to said source of field conversion signals and said field identification signals for modifying the writing and reading of data in and out of said memory storage means so as to provide field conversions consistent with said non-variant field sequence.

2. A television signal synchronizer in which incoming video signals are written into memory storage means, said incoming video signals comprising one or more television fields, each of said television fields comprising horizontal line signals having a horizontal blanking interval containing horizontal and burst synchronizing signal components and an active image information portion, said burst signal component being opposite in phase from one of said television fields to another, said television fields being subject to conversion on reading out of said memory storage means, comprising:

coherent memory storage means having preassigned fixed burst phasing for each line store of said memory storage means;

first signal processing means for developing a first composite horizontal sync and burst timing control signal indicative of the timing of said incoming video signal;

first delay means responsive to said first control signal for delaying the writing into memory of only said active video image information portions so as to write said video image information portion into said memory storage means consistent with said preassigned fixed burst phasing for each of said television fields;

means for generating a non-variant field write in sequence;

second signal processing means for developing a second composite horizontal sync and burst timing control signal indicative of the timing of said non-variant field sequence; and second delay means responsive to said second control signal for delaying the reading out of memory of only said active video image information portions so as to read said video image information portion of each of said television fields out of said memory storage consistent with said non-variant field write-in sequence.

3. A television signal synchronizer in which incoming video signals are written into memory storage means, said incoming video signals comprising one or more television fields, each of said television fields comprising horizontal line signals having a horizontal blanking interval containing horizontal and burst synchronizing signal components and an active image information portion, said burst signal component being opposite in phase from one of said television fields to another, said television fields being subject to conversion on reading out of said memory storage means comprising:

coherent memory storage means having preassigned fixed burst phasing for each line store of said memory storage means;

means for generating a non-variant field read out sequence first signal processing means for developing a first composite horizontal sync and burst timing control signal indicative of the timing of said non-variant field sequence;

first delay means responsive to said first control signal for delaying the reading out of memory of only said active video image information portions so as to read said video image information portion of each of said fields out of said memory storage means consistent with said non-variant field read out sequence second signal processing means for developing a second composite horizontal sync and burst timing control signal indicative of the timing of said incoming video signal and second delay means responsive to said second control signal for delaying the writing-into memory of only said active video image information portions so as to write said video image information portion of each of said television fields into said memory storage consistent with said preassigned fixed burst phasing for each of said television fields and said non-variant field read out sequence.

* * * * *